United States Patent
Stadelmeier et al.

(10) Patent No.: US 7,564,878 B2
(45) Date of Patent: Jul. 21, 2009

(54) METHOD FOR OPERATING AN RLAN ARRANGEMENT

(75) Inventors: Lothar Stadelmeier, Stuttgart (DE); Frank Dawidowsky, Stuttgart (DE); Heimo Guth, Ludwigsburg (DE); Gerd Spalink, Stuttgart (DE); Jens Höfflinger, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 742 days.

(21) Appl. No.: 10/765,728

(22) Filed: Jan. 26, 2004

(65) Prior Publication Data

US 2004/0157580 A1  Aug. 12, 2004

(30) Foreign Application Priority Data

Jan. 28, 2003  (EP)  ................... 03002025

(51) Int. Cl.
- *H04J 1/00* (2006.01)
- *H04B 1/06* (2006.01)
- *H04B 1/16* (2006.01)
- *H04W 4/00* (2006.01)

(52) U.S. Cl. .................. 370/908; 370/329; 370/343; 455/338; 455/353

(58) Field of Classification Search ......... 370/280–338, 370/386–395, 431–468; 455/338–353, 423–452, 455/67–69; 342/159–192
See application file for complete search history.

(56) References Cited

U.S. PATENT DOCUMENTS

| | | | | |
|---|---|---|---|---|
| 4,829,554 | A * | 5/1989 | Barnes et al. ............. | 455/432.1 |
| 6,041,238 | A * | 3/2000 | Tanoue .................... | 455/452.2 |
| 6,208,629 | B1 * | 3/2001 | Jaszewski et al. .......... | 370/329 |
| 6,615,040 | B1 * | 9/2003 | Benveniste ................. | 455/423 |
| 6,671,495 | B1 * | 12/2003 | Lappetelainen et al. .. | 455/67.11 |
| 6,697,013 | B2 * | 2/2004 | McFarland et al. ......... | 342/159 |
| 6,865,166 | B1 * | 3/2005 | Wilcoxson et al. ......... | 370/330 |
| 6,985,465 | B2 * | 1/2006 | Cervello et al. ............ | 370/333 |
| 7,016,684 | B2 * | 3/2006 | Cave et al. ................. | 455/450 |
| 7,024,188 | B2 * | 4/2006 | Khun-Jush et al. ......... | 455/423 |
| 7,120,138 | B2 * | 10/2006 | Soomro et al. ............. | 370/343 |
| 7,146,176 | B2 * | 12/2006 | McHenry ................... | 455/454 |
| 7,206,840 | B2 * | 4/2007 | Choi et al. ................. | 709/225 |

(Continued)

FOREIGN PATENT DOCUMENTS

EP  0 579 372  1/1994

(Continued)

OTHER PUBLICATIONS

ETSI: "Broadband Radio Access Networks (BRAN); HIPERLAN Type 2; Data Link Control (DLC) Layer; Part 2: Radio Link Control (RLC) sublayer" ETSI TS 101 761-2 V1.3.1, Jan. 2002, pp. 1-4, 72-88, XP002247210.

*Primary Examiner*—M. Phan
(74) *Attorney, Agent, or Firm*—Oblon, Spivak, McClelland, Maier & Neustadt, P.C.

(57) ABSTRACT

A method of operating a wireless network, including detecting at least one signal of an external radio source, by a network device of the wireless network, during normal operation of the wireless network, in which while detecting, the network device does not send data to another network device of the wireless network, and changing a communication channel or frequency band, if the at least one signal overlaps with a currently used communication channel or frequency band.

8 Claims, 7 Drawing Sheets

U.S. PATENT DOCUMENTS 7,263,366 B2 * 8/2007 Miyashita ................ 455/452.2
2005/0043047 A1 * 2/2005 Vigier et al. ................ 455/509

FOREIGN PATENT DOCUMENTS

EP 1 248 477 10/2002
EP 1 298 949 4/2003
WO WO 03/001742 1/2003

* cited by examiner

METHOD FOR OPERATING AN RLAN ARRANGEMENT

BACKGROUND OF THE INVENTION

The present invention relates to a method for operating an RLAN arrangement, said RLAN arrangement comprising a plurality of communication units or communication nodes.

Nowadays, wireless communication with the networks becomes more and more popular. Therefore, in the field of wireless local area networks or WLANs, so-called radio local area networks or RLANs, were introduced. Such an RLAN comprising a plurality of communication units or communication nodes, one of which being a central controller CC or an access point AP and the latter of which being so-called wireless terminals WT.

As the communication of an RLAN is established by transmitting and receiving radiation in the radio frequency range interference may occur with other and separated RLAN arrangements and/or with external radar services or radar sources.

In particular, in the 5 GHz band or range communication was until now restricted to radar services and radar devices. Nowadays, said former radar services are referred to as primary users for the 5 GHz band or range, whereas RLAN arrangements or concepts in the 5 GHz band or range are referred to as secondary users. That means, that the complete 5 GHz band or range has to be shared by said primary users or radar services and by said secondary users or RLAN arrangements giving a communication priority to the primary users. In particular the ranges from 5,150 GHz to 5,350 GHz and from 5,470 GHz to 5,725 GHz are allocated to RLANs.

For establishing and ruling such a sharing concept, regulatory requirements for the secondary users have been established. That means that the presence of primary users has to be checked during the operation of the secondary users. If a primary user occurs and a coincidation overlap of the communication channels has to be expected, the communication channel has to be changed by the secondary users.

Known methods for monitoring the presence of primary users or radar services are not reliable enough and decrease the communication efficiency during known RLAN arrangements.

BRIEF SUMMARY OF THE INVENTION

It is, therefore, an object of the present invention to provide a method for operating an RLAN arrangement which is adapted to perform monitoring of primary user or radar/radio services in a particular reliable manner with an reduced effect on the RLAN communication performance.

The object is achieved by a method for operation an RLAN arrangement according to the characterizing features of independent claim 1. The object is further achieved by an RLAN arrangement, a computer program and a computer readable storage medium according to the characterizing features of independent claims 11, 12, and 13, respectively. Preferred embodiments of the inventive method for operating the RLAN arrangement are within the scope of the dependent sub claims.

In the sense of the invention the RLAN arrangement has a plurality of communication units or communication nodes. According to the present invention the method for operating such an RLAN arrangement comprises a step or process of monitoring and/or of detecting the presence of signals of or from external radio sources or radar sources. Upon the presence of signals of or from an external radio source or radar source or upon detection thereof in the case of a coincidation and/or an overlap of an actual communication channel or frequency band of the RLAN arrangement with a channel or frequency band of of the signal of or from the external radio source or radar source the actual communication channel or frequency band of the RLAN arrangement is changed. Set step or process of monitoring and/or detecting the presence of signals of or from external radio sources or radar sources is performed by at least one of said communication units or communication nodes which are not in a transmission state. These communication units or communication nodes are used as monitoring units. Thereby, a continuous and uninterrupted monitoring and/or detection of the presence of signals of or from external radio sources or radar sources over the complete operation time of the RLAN arrangement is realized, in contrast to prior art methods for operating RLAN arrangements where the monitoring process is based on the assignment of measurement periods within particular time frames making the protocol and the message exchange comparable complex.

It is, therefore, a basic idea of the present invention to shift the responsibility for the monitoring and/or detection process to communication units or communication nodes of the RLAN arrangement in question which are not in a state of transmitting information. As in an RLAN arrangement at most one communication unit or communication node is activated in a transmitting or transmission state, all other communication units or communication nodes may potentially be used as monitoring units in the sense of the invention, thereby covering the complete operation time of the RLAN arrangement with respect to the monitoring and/or detecting process.

Another view of a basic idea of the invention is to provide almost 100% coverage of radar detection. This may additionally or alternatively be achieved by a tx power level adjustment that allows said 100% coverage. A main focus of the invention is the overall coverage and/or on methods to achieve this coverage.

Although, a single communication unit or communication node is sufficient for entirely or completely covering the operation time of the RLAN arrangement, it is of particular advantage, when said step or process of monitoring and/or detecting the presence of signals of or from external radio sources or radar sources is performed by a plurality of said communication units or communication nodes being not in a transmission state as a plurality of monitoring units. This may be done in a distributed manner, where a given monitoring time interval may be subdivided or spread over said plurality of monitoring units.

Additionally or alternatively, said step or process of monitoring and/or detecting the presence of signals of or from external radio sources or radar sources may be performed by the entirety of said communication units or communication nodes being not in a transmission state as a plurality of monitoring units. This gives a higher degree of flexibility and reliability with respect to the process or step of monitoring and/or detecting external radar signals. This may also be done in a distributed manner as already elucidated above.

According to a further advantageous alternative of the present invention said communication units or communication nodes perform as said monitoring units said step or process of monitoring and/or detecting the presence of signals of or from external radio sources or radar sources at most in a receiving state and/or in a monitoring state, in particular during receivings periods and/or idle/monitoring periods of a MAC frame.

One has to distinguish between 802.11 networks and HiperLAN2 or HL2 networks.

In HL2, an AP or a WT, i.e. a wireless terminal, can be in three states, i.e. a transmit state, a receive state, and an idle state. The MAC frame of a device is e.g. 2 ms long and is built by (any) concatenation of these three states. A device listens to the air during idle and receive states and can detect radar signals during these periods.

In 802.11a or 802.11h networks, there is no dedicated MAC frame. If the device has to send packets it turns into its transmit state. Otherwise it listens to the air. No dedicated 2 ms time framing as in HL2 is given.

A common bottom line or common principle is that a device can listen for radar services whenever it is not in a transmit state.

The impact is significant. The notion 'non transmit phases' for radar detection might be relevant instead of a MAC frame expression and its receive and idle states. Whenever talking about MAC framing an example for a HiperLAN2 implementation is given.

As already indicated above an RLAN arrangement or RLAN consists of communication units or communication nodes one of which being an access point AP or a central controller CC and the remaining being so-called wireless terminals WT or wireless terminal devices.

Therefore, according to a further preferred embodiment of the present invention a wireless terminal or wireless terminal device as a component of said RLAN arrangement is used as said communication unit or as said communication node, in particular as said monitoring unit.

Additionally or alternatively, a central controller CC and/or an access point AP as a component of said RLAN arrangement is used as said communication unit or as said communication node, in particular as said monitoring unit.

It is always necessary to find a balance with respect to the sensitivity level of the monitoring units. On the one hand, it is necessary to be sensitive enough, so that the important external radio sources or radar sources can be detected or monitored as primary users. On the other hand, it is not necessary to detect such external radio sources or external radar sources which are below a given threshold with respect to said sensitivity level, as those external radio sources or external radar sources may be referred to as distant external sources implying no conflict even when the respective communication channels coincide or overlap. Therefore, for each of said monitoring units a predefined sensitivity level and/or sensitivity threshold is used.

It is a basic idea to adjust all Tx levels or transmission levels in a way that the receiving levels or Rx levels are between this sensitivity threshold and the receiver sensitivity.

It is of particular advantage to adapt and/or to set within said receiving periods or in said receiving state said monitoring units to a receiving power level or Rx level which enables stable service receipt or a stable receipt of internal signals which enables a detection of the presence of signals of or from external radio sources or radar sources down to a given predefined threshold, in particular with said given sensitivity level or sensitivity threshold. This may be done by calculation e.g. by transmission power level attenuation or Tx level attenuation.

Alternatively or additionally, it is of further advantage to adjust and/or to set within transmitting periods or in the transmitting state said communication units or communication nodes continuously to a transmitting power level, which enables a stable service receipt or a stable receipt of internal signals and which enables a detection of the presence of signals of or from external radio sources or radar sources down to a given and predefined threshold, in particular with said given sensitivity level or sensitivity threshold.

It is always the Tx level that is adjusted. The Rx level on the other side of the communication path varies depending on the Tx level and of course the current attenuation over the air.

According to a further embodiment of the inventive method upon detection of an interference pattern by a wireless terminal a message CHANNEL_INTERFERENCE_DETECTION announcing a detection of an interference pattern is send from said detecting wireless terminal to a central controller and/or wherein upon receipt of a message CHANNEL_INTERFERENCE_DETECTION announcing a detection of an interference pattern a message CHANNEL_INTERFERENCE_DETECTION_ACK indicating the acknowledgement of said message CHANNEL_INTERFERENCE_DETECTION is sent by said central controller.

The basic idea of the messages related to the invention is simple: When having autonomous radar detection, we need a new mechanism for the WTs to inform the CC/AP about the detection of a radar signal. Exactly that's the purpose of this messages.

It is a further aspect of the present invention to provide an RLAN arrangement which is capable of performing or realizing the inventive method for operating an RLAN arrangement and/or the steps thereof.

According to a further aspect of the present invention a computer program is provided comprising computer program means being adapted to realize the inventive method for operating an RLAN arrangement or the steps thereof when it is executed on a computer, a digital signal processing means or the like.

Further, according to the present invention a computer readable storage medium is provided comprising the inventive computer program.

These and further aspects of the present invention will become more elucidated taking into account the following remarks:

RLANs are secondary users in the 5 GHz frequency band. Therefore, they have to prevent interference with primary users, namely radar services. The dynamic frequency selection or DFS algorithms that are used so far are based on an assignment of measurement periods during transmission pauses. Reliable radar detection is so far not possible without significant restrictions regarding data traffic and the available bandwidth.

The invention proposes a mechanism that allows the detection of radar systems for 100% of the operation time. Further, appropriate receiving power adjustment allows autonomous measurements of each device without any disturbance of or by the data traffic. Control messages indicating a radar detection to the Wireless Controller are introduced.

The current HiperLAN/2 standard specifies messages related to a DFS algorithm which only allow the detection of the received signal strength. The DFS mechanism in the HiperLAN/2 standard does not specify any messages or algorithms to detect radar. In the original sense, DFS was intended to detect interference from other RLANs.

This standard also allows a change of the operating frequency initiated by the controller. The DFS algorithm is not specified in the HiperLAN/2 standard. It is intended to be used to distribute the operating frequency of the wireless HL/2 networks equally across the frequency band.

In the IEEE 802.11a specification, no algorithm for frequency change and DFS measurements is specified.

IEEE 802.11h specifies spectrum management for IEEE802.11a. This document is published as a draft.

The DFS approaches used by both standards are based on the assignment of measurement periods, while the present invention inverts this approach by performing autonomous radar detection.

In Europe, the 5 GHz band is open for so called "primary users" like Mobile Satellite Services and for "secondary users" like RLANs. The regulatory requirements for secondary users are that a test for the presence of primary users. If a primary user is found another channel must be used and that even, if no primary user is present, the RLANs distribute themselves equally across the frequency band The detection mechanisms that are used so far by the DFS (Dynamic Frequency Selection) algorithms are based on an assignment of measurement periods by the network controller, e.g. AP or CC in HiperLAN2. The controller can ask Wireless Terminals (WTs) to measure within a dedicated time frame, e.g., in multiples/of one MAC frame, for interferers. This means additional complexity of the protocol and additional message exchange overhead in the wireless network. There are basically two measurement possibilities.

In the first, CC stops all traffic during the measurement period. Although the detection probability of the radar is best, this solution has the big disadvantage of interruption of data traffic, This might be acceptable for data transmissions but is not for services that require a constant bandwidth like video streams ('Quality of Service').

In the second, WT measures only when no traffic is on air (percentile measurements). The WT is asked to detect radars only in parts of the MAC frame without traffic. Radar pulses that might occur during traffic phases are not recognized if the power level of the RLAN connection is too high.

Disadvantages are that the network can not look every time for radar signals and that only parts of the MAC frame can be used for radar detection.

Measurements on the RF channel are always performed over a time frame of at least one MAC frame. Distributed measurements of several WTs within one MAC frame are so far not possible.

This invention describes an approach where 100% of each MAC frame can be used for listening to interferers without any restrictions to data traffic.

A typical 5 GHz transceiver system consists of an antenna, an RF frontend, a baseband processing unit as well as a micro processor to manage the user data traffic as well as the network control commands. The baseband DSP contains a radar detection unit that reports the occurrence of potential radar systems to the Micro Controller.

One idea of this invention is to move the responsibility for radar detection to the WTs—without dedicated assignment of measurement periods. Each device looks autonomously during 100% of its receiving time and the idle times of the MAC frame for radar services. Only during a transmission time the device cannot detect radars. During this time frame another device performs radar detection as only one device can transmit at a given point in time. Overall 100% coverage for radar detection is achieved.

Radar detections may be reported immediately by the WT to the controller of the network. In order to guarantee the radar detection during receiving periods the power level of the received connection has to be adjusted in a way that stable transmission of the services is still possible and that radar services at the requested threshold can be detected.

Adjustment of the power level is part of the standards (e.g. in HiperLAN2 RLC-UPLINK-PC-CALIBRATION and RLC_DM_POWER_CONTROL, . . . ).

The draft ETSI standard ETSI EN 301 893 defines the level of incoming radar signals that have to be detected to a certain level. Weaker radar signals mean high distance to the radar source and therefore no impact of the RLAN to the radar.

Stable transmission, even when using the less robust phy mode, shall be possible down to at least another certain level (see ETSI standard ETSI TS 101 475).

If the receiving level of the connections is adjusted appropriately both conditions mentioned above can be fulfilled. All 5 GHz wireless technologies that require radar detection have appropriate control commands to adjust the power level in the desired way.

Since all devices in the wireless network measure autonomously to detect radar signals a new control message mechanism is needed to inform the controller of the network about the radar occurrence. The control flow for radar detection becomes easier since the request response mechanism is replaced by a simple reporting mechanism that is triggered by the measuring device itself.

New control messages can be used to inform the controller about an interfering event:

Channel_Interference_Detection:

Functionality:
  WT informs controller about the detection of an interferer on the current RF channel.

Parameters:

| INTERFERER | informs the controllerabout the type of interferer |
|---|---|
| 0 | primary user (radar) |
| 1 | RLAN of same type (preamble can be decoded) |
| 2 | unknown RLAN type (preamble can't be decoded) |
| 3 | unkown interferer |

Channel_Interference_Detection_Ack:

Functionality:
  Controller acknowledges the incoming CHANNEL_INTERFERENCE_DETECTION message Parameters:

NONE

Ideas and Advantages of the Inventions:
  Three main ideas are part of this invention are to
  adjust the transmission power level between the radar detection threshold and the receiver sensitivity,
  radar detection process in all non-transmission phases or in all phases of the MAC frame, except in own transmission phases, and
  perform the radar detection autonomously, whenever possible and needs no control/assignment from a controlling instance.
  Above mentioned mechanisms give following advantages that
  the radar detection can be achieved 100% of the time without interruption of data traffic and that
  a simpler protocol is given.

BRIEF DESCRIPTION OF THE SEVERAL VIEWS OF THE DRAWINGS

In the following, the invention will be described in more detail taking reference to the accompanying figures on the basis of preferred embodiments of the invention.

DETAILED DESCRIPTION OF THE INVENTION

In the following, same elements and functions are indicated by the same reference symbols, and their detailed description is not repeated for each occurrence thereof.

Figure 1:
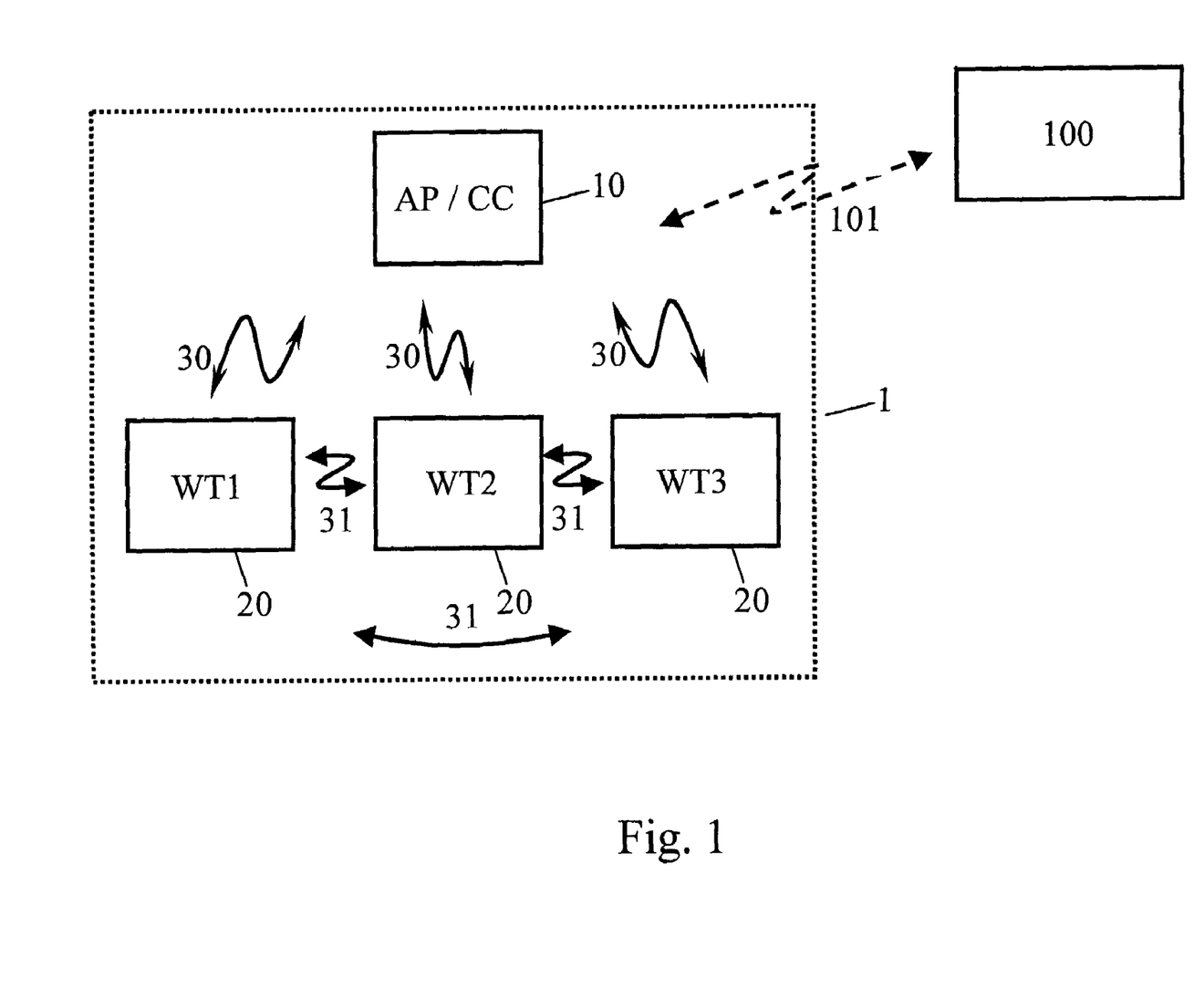
FIG. 1 is a schematical block diagram illustrating an RLAN arrangement which can be operated by the inventive method.

FIG. 1 demonstrates the basic structure of an RLAN arrangement 1 which can be used within the present invention. The RLAN arrangement 1 in question is built up by a variety of communication units 10, 20 or communication nodes 10, 20. This variety is constituted by a single access point AP or central controller CC by which the entire RLAN arrangement 1 and its operation are controlled. Further, wireless terminals WT1 to WT3 are provided. First and second communication channels 30, 31, respectively, establish the communication of the wireless terminals WT1 to WT3 with the access point AP or central controller CC and to the other wireless terminals WT1 to WT3, respectively.

In spatial relation to the RLAN arrangement 1 an external radio source 100 or radar source 100 is given being capable to realize communication or to emit external signals via a communication channel 101.

The present invention is adapted to check during the operation time of the RLAN arrangement 1 on whether or not there is a coincidence of the communication channel 101 of the external radar source 100 with at least one of the communication channels 30 or 31 of the RLAN arrangement 1, in which case the actual communication channel 30, 31 of the RLAN arrangement has to be changed.

Figure 2:
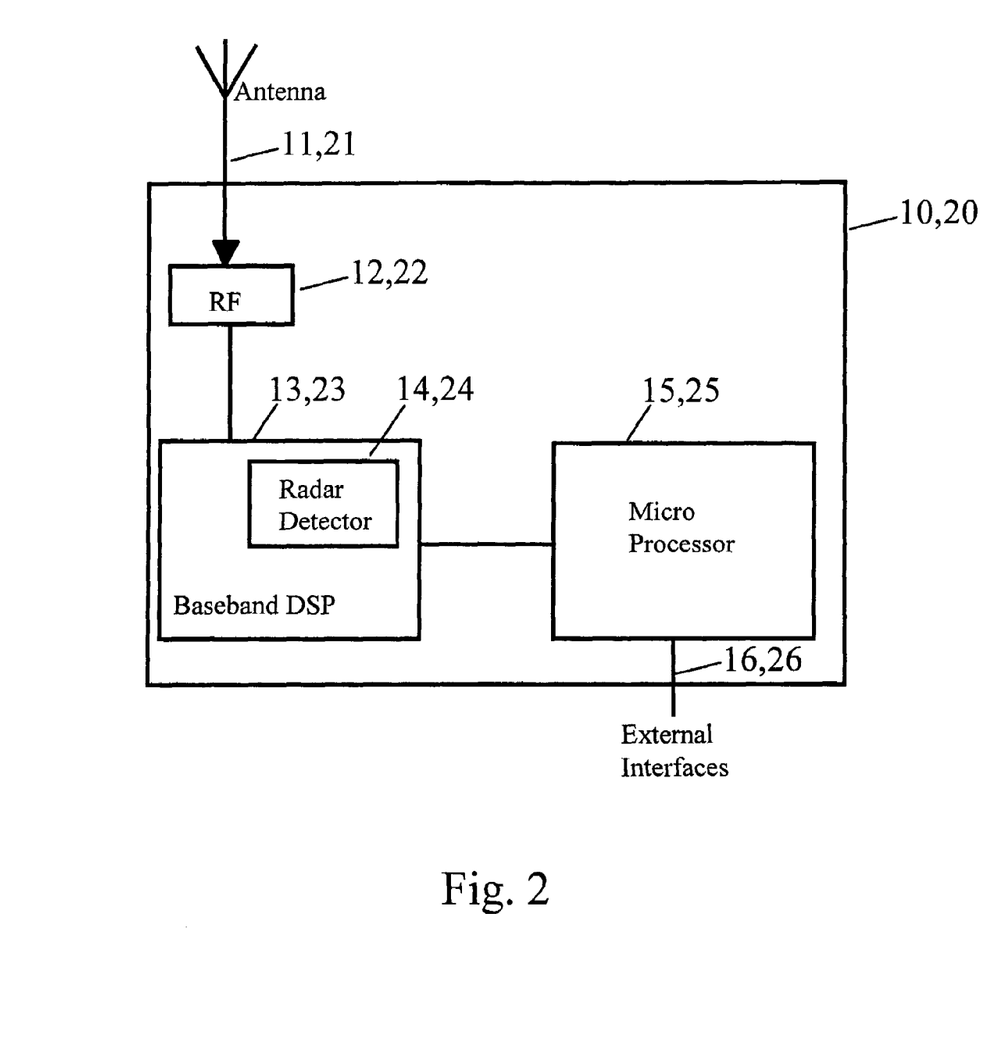
FIG. 2 is a schematical block diagram of a communication unit or communication node which can be used in the inventive method for operating an RLAN arrangement.

A basic idea of the present invention is that the responsibility for the step or process of monitoring and/or detecting the presence of signals of or from the external radio source or radar source 100 is given to at least one of the communication units 10, 20 or communication nodes 10, 20 which are not in a state of transmission. Therefore, any of the wireless terminals WT1 to WT3 or the central controller CC which are not transmitting at the given time period may be used as a monitoring unit for monitoring and/or detecting the presence of signals of or from external radio sources or radar sources 100. The block diagram of FIG. 2 elucidates in more detail the internal structure of anyone of the communication nodes 10, 20 or communication units 10, 20 shown in FIG. 1. Each of the communication units 10, 20 or communication nodes 10, 20 consists of an antenna 11, 21, a RF section 12, 22, followed by a base band digital signal processor 13, 23 which comprises a radar detector 14, 24. Additionally, a microprocessor 15, 25 is provided which is connected to the base band DSP 13, 23 and on the other side which external interfaces via a respective external terminal 16, 26.

Figure 3:
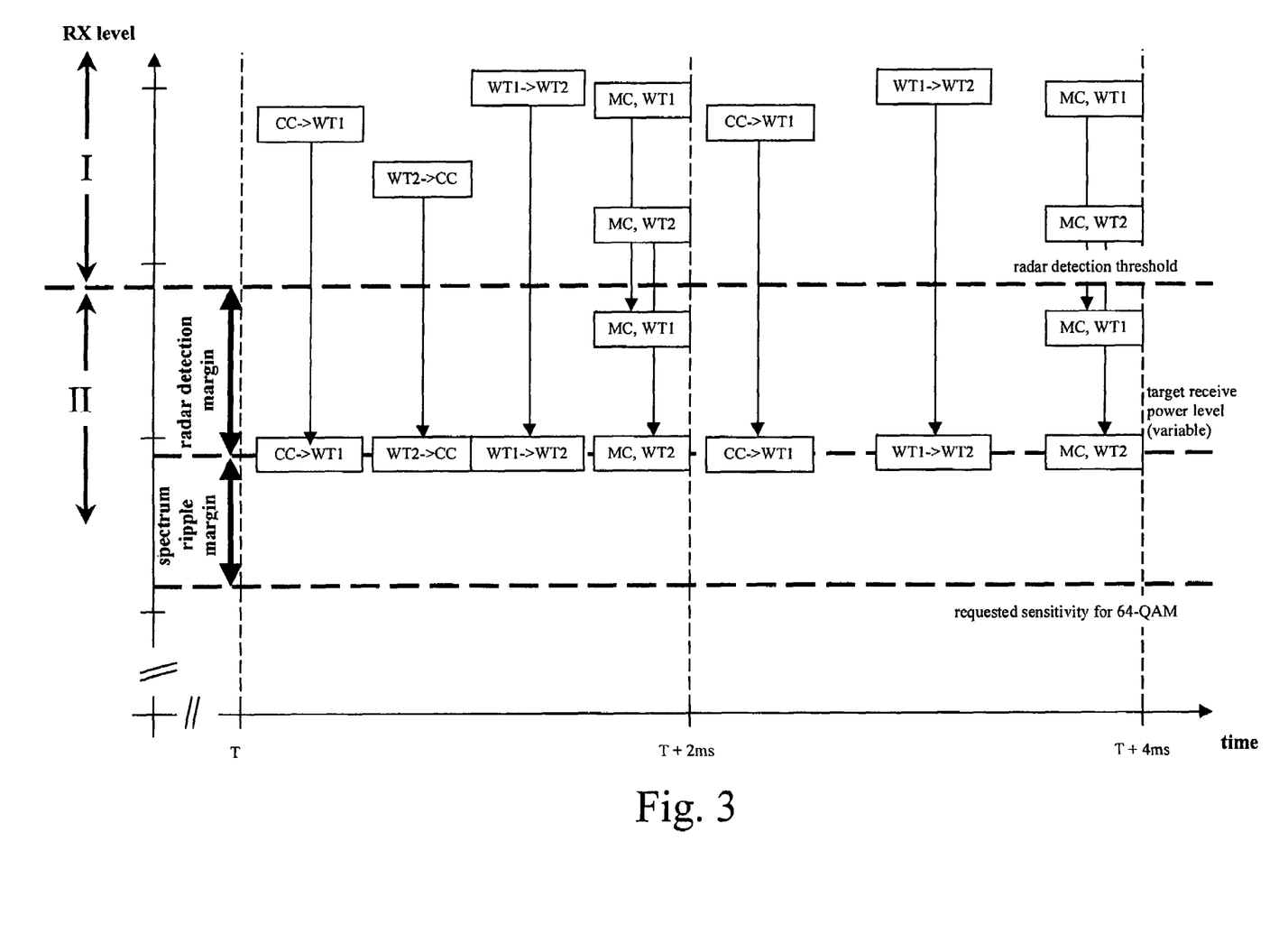
FIG. 3 demonstrates the different power levels and their adjustment according to the present invention.

FIG. 3 illustrates the adjustment of the power levels. The blocks of section I show the different parts of a MAC frame with the different receiving levels, when no appropriate power adjustment is done. Typically the receiving levels are above the requested radar detection threshold, i.e., radar detection is only possible during MAC frame periods without data traffic.

The blocks of section II illustrate the same MAC frame with the proposed power adjustments. Since the target power level is between the radar detection threshold as well as the requested sensitivity of the receiver it is possible to guarantee stable data traffic on the RLAN as well as secure detection of radars even during receiving periods.

Finding the best performing target power level is platform dependant and will vary from solution to solution.

In the example above with three devices in the network (CC, WT1 and WT2) all typical types of traffic are covered, namely in a central mode unicast connections between the CC and a WT, in a direct mode connection between two WTs, and multicast/broadcast connections with one sender. In this latter case it is enough to decrease the Tx power level of the sender until one receiver is adjusted to the target power level. This device can perform radar detections. All other receivers may remain above this power level.

Figure 4:
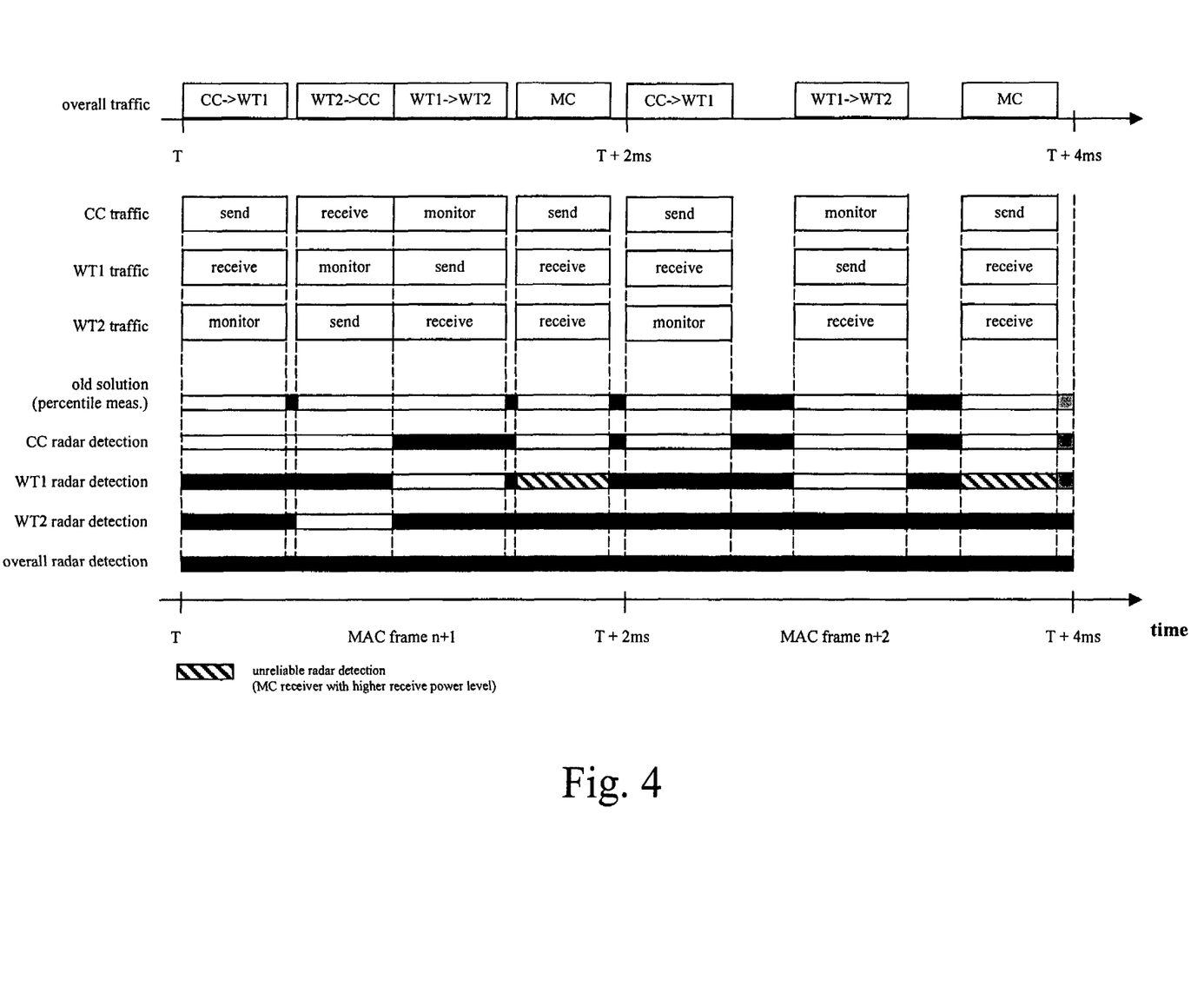
FIG. 4 demonstrates the different time periods which can be used for a radar detection according to the present invention.

FIG. 4 shows the different time periods that can be used for radar detection (depicted time: 2 MAC frames):

As depicted in the bottom line "overall radar detection" of the diagram an overall 100% coverage of radar detection can be achieved with the proposed mechanism. The old method for 'in traffic' measurements (percentile measurements) allows for less measurement periods the higher the traffic load of the network is.

Figure 5:
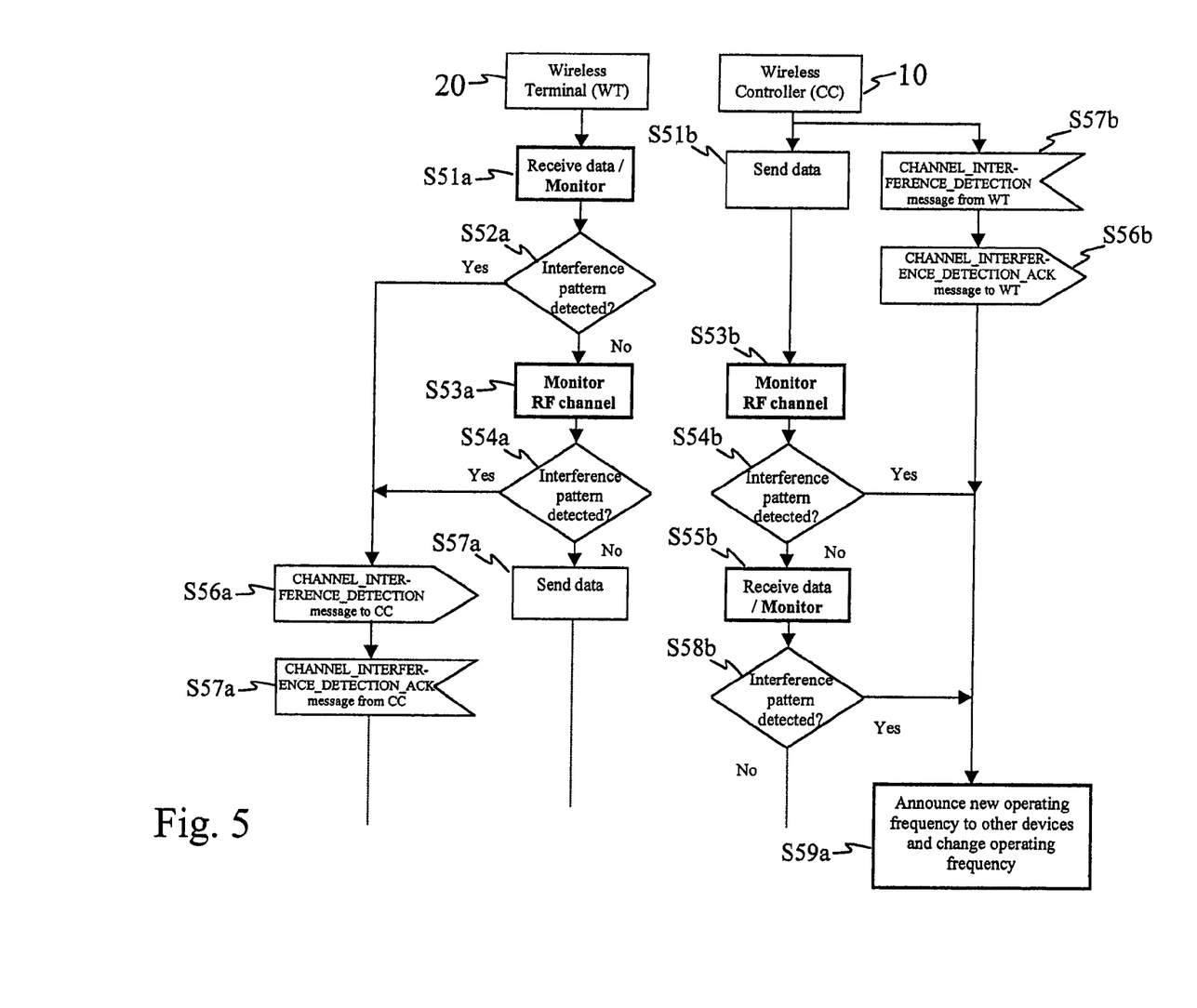
FIG. 5 is a flow chart of the inventive radar detection mechanism.

FIG. 5 elucidates by means of two block diagrams preferred embodiments of the inventive method for operating an RLAN arrangement. The left-hand side of FIG. 5 relates to the performance of a wireless terminal WT1 to WT3, whereas the right-hand side of FIG. 5 relates to the performance of a central controller CC or access point AP.

In the performance of a wireless terminal WT1 to WT3 or 20 in a first step S51a a wireless terminal WT1 to WT3 is in a receiving state and simultaneously monitors the possible presence of external signals stemming from an external radar source 100.

In a step S52a it is checked, if an interference pattern was detected. If this is not the case the proceedings continue with a step S53a for monitoring the RF channel. In a following step S54a again a check with respect to possible detected interference patterns is performed. If this is not the case, in the following step S55a data are sent out. In each case of a detection of interference patterns the proceedings branch to steps S56a und S57a for transmitting a detection message to the central controller CC and to receive an acknowledgement message from the central controller CC, respectively.

The performance for the central controller CC 10 starts with the process S51b of sending out data. In a following step S53b the RF channel is monitored. In the following step S54b the channel is checked for detected interference patterns. If there are not detected interference patterns data are received and the channel is again monitored in step S55b. In the following step S58b it is again checked on whether or not interference patterns are detected. In each case of detected interference patterns new operating frequency or frequency bands are announced to other devices and then the operating frequency or communication frequency band are changed in step S59b.

Figure 6:
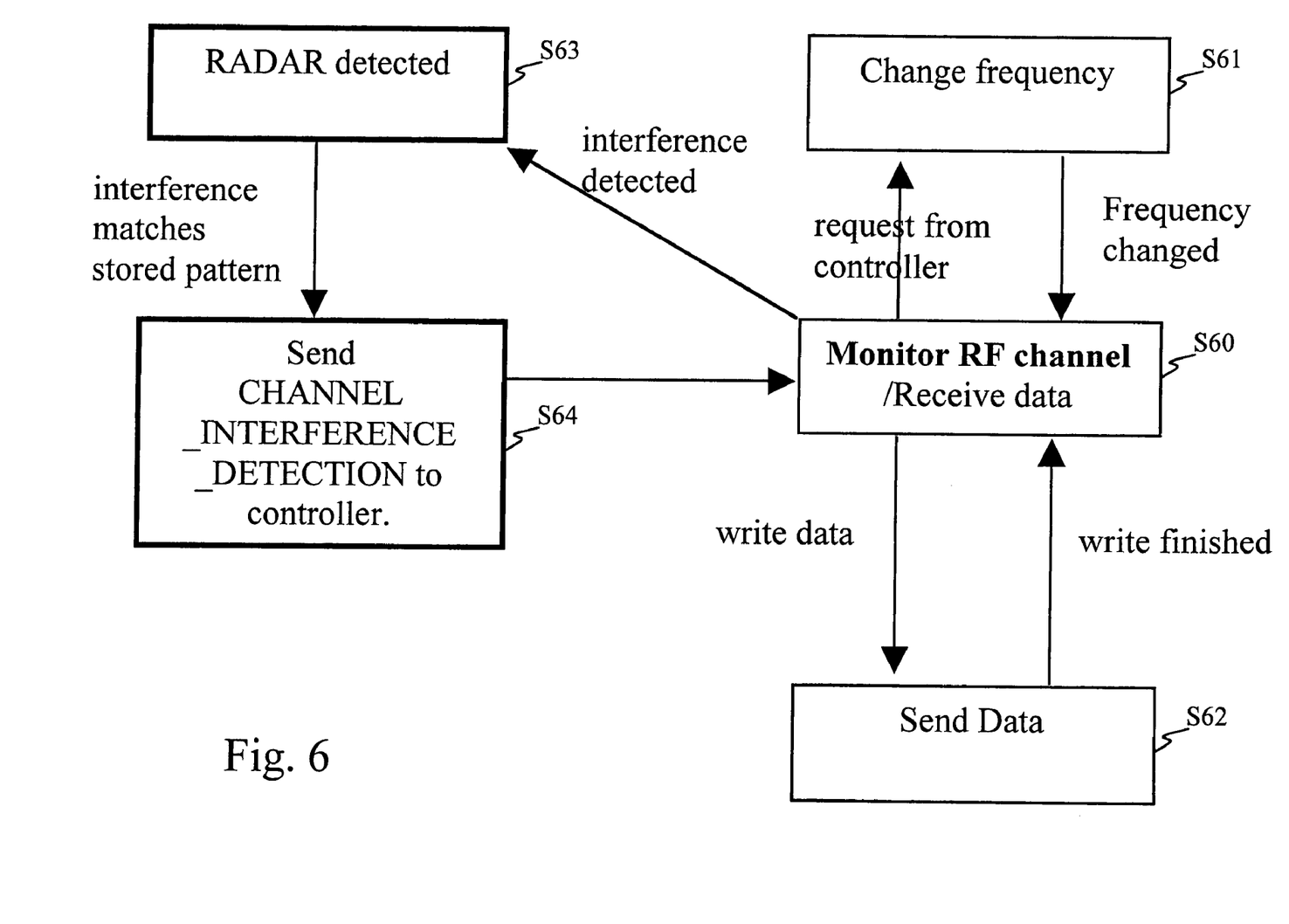
FIG. 6 is a block diagram demonstrates a typical state machine for the inventive radar detection mechanism.
Figure 7:
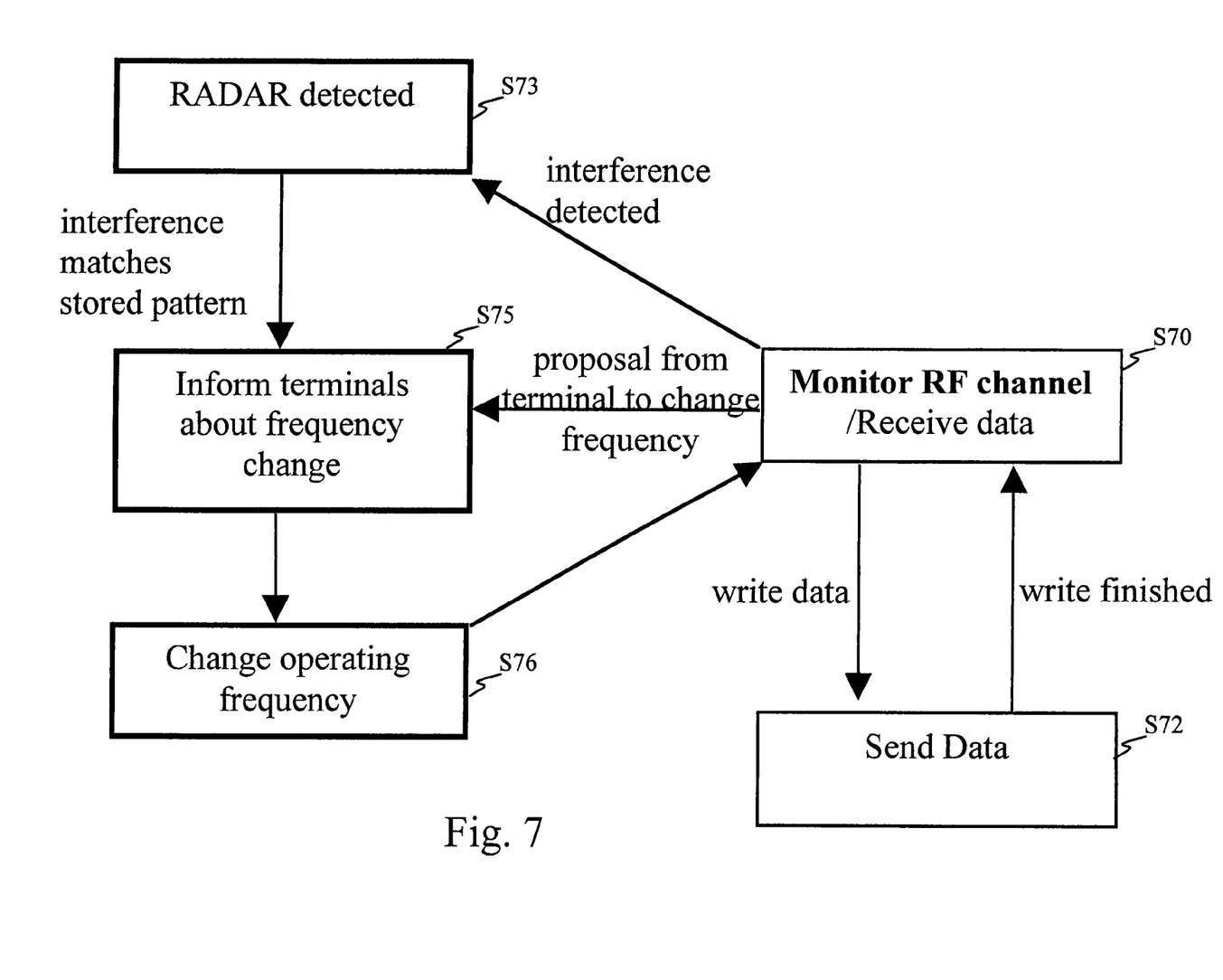
FIG. 7 is a block diagram of a further example of a state machine for the inventive radar detection mechanism.

FIGS. 6 and 7 describe by means of block diagrams different state machines for the inventive method for operating an RLAN arrangement.

The invention claimed is:

1. A method of operating a wireless network, comprising:
   detecting at least one signal of an external radio source, by a network device of said wireless network, while data is transmitted over the wireless network and said network device does not send data to another network device of said wireless network;
   changing a communication channel or frequency band, if said at least one signal overlaps with a currently used communication channel or frequency band; and
   setting a transmitting power level of said network device such that a receiving power level at said another network device lies between a first threshold and a second threshold, wherein
   in the step of setting the transmitting power level, said second threshold represents a detection level of radar signals, radar signals having a higher signal level than said detection level are detectable with a first detection rate, and radar signals having a lower signal level than said detection level are detectable with a second detection rate, said first detection rate being higher than said second detection rate.

2. The method according to claim 1, wherein said step of detecting is performed by at least one further network device of said wireless network, and
   said further network device does not send data to another network device of said wireless network.

3. The method according to claim 1, wherein said step of detecting is performed during a non-transmission period of a MAC frame.

4. The method according to claim 1, wherein in the step of setting the transmitting power level, said first threshold is set to comply with a sensitivity specified according to a standard of the wireless network.

5. The method according to claim 1, wherein, upon detection of said at least one signal of said external radio source, said network device sends a first message to a central controlling network device of said wireless network, said first message indicating that said at least one signal has been detected.

6. The method according to claim 5, wherein, when said central controlling network device has received said first message, said central controlling network device sends an acknowledge message to said network device.

7. A computer-readable storage medium having embedded therein instructions that cause a computer to execute a method of operating a wireless network, comprising:
   detecting at least one signal of an external radio source, by a network device of said wireless network, while data is transmitted over the wireless network and said network device does not send data to another network device of said wireless network;
   changing a communication channel or frequency band, if said at least one signal overlaps with a currently used communication channel or frequency band; and
   setting a transmitting power level of said network device such that a receiving power level at said another network device lies between a first threshold and a second threshold, wherein
   in the step of setting the transmitting power level, said second threshold represents a detection level of radar signals, radar signals having a higher signal level than said detection level are detectable with a first detection rate, and radar signals having a lower signal level than said detection level are detectable with a second detection rate, said first detection rate being higher than said second detection rate.

8. A network device of a wireless network, comprising:
   an RF unit configured to receive a radar signal of an external radio source, and to send/receive a data signal of said wireless network;
   a radar detector configured to detect a presence of said radar signal, while data is transmitted over the wireless network and said RF unit does not send the data signal to another network device of said wireless network;
   a micro processor configured to change a communication channel or frequency band of said RF unit, if said radar signal overlaps with a currently used communication channel or frequency band; and
   a power setting unit configured to set a transmitting power level of said network device such that a receiving power level at said another network device lies between a first threshold and a second threshold, wherein
   said second threshold represents a detection level of radar signals, radar signals having a higher signal level than said detection level are detectable with a first detection rate, and radar signals having a lower signal level than said detection level are detectable with a second detection rate, said first detection rate being higher than said second detection rate.

* * * * *